United States Patent [19]

Combe et al.

[11] Patent Number: 5,665,196
[45] Date of Patent: Sep. 9, 1997

[54] WELD/CUT COUNTER-HEAD FOR MACHINE FOR JOINING AND CUTTING SHEETED MATERIALS

[75] Inventors: Robert Combe; Serge Moulin, both of Sory le Comtal, France

[73] Assignee: Cera France Compagnie D'Equipement Robotique Appliquee, France

[21] Appl. No.: 449,810

[22] Filed: May 24, 1995

[30] Foreign Application Priority Data

May 24, 1994 [FR] France ................... 94 06502

[51] Int. Cl.⁶ .................. B32B 31/04; C09J 5/00
[52] U.S. Cl. ............... 156/515; 156/530; 156/580; 156/583.1; 493/208; 53/374.4
[58] Field of Search ............... 156/515, 530, 156/251, 73.3, 580.1, 583.1; 53/371.4, 373.4, 373.5, 374.2, 374.4; 493/205, 208; 83/171

[56] References Cited

U.S. PATENT DOCUMENTS

| | | | |
|---|---|---|---|
| 1,774,497 | 8/1930 | Wandel | 156/251 |
| 1,891,745 | 12/1932 | Bonsieur | 156/515 |
| 1,949,490 | 3/1934 | Ross | 164/76 |
| 2,012,753 | 8/1935 | Chase | 156/251 |
| 2,117,452 | 5/1938 | Robinson et al. | 156/251 |
| 2,551,811 | 5/1951 | Mueller | 156/515 |
| 2,794,485 | 6/1957 | Ashton et al. | 156/515 |
| 2,893,468 | 7/1959 | Fieroh | 53/374.4 |
| 2,987,107 | 6/1961 | Sylvester et al. | 154/42 |
| 3,115,564 | 12/1963 | Stacy | 156/251 |
| 3,905,264 | 9/1975 | Eddy | 83/481 |
| 3,970,509 | 7/1976 | Vitale | 156/580 |
| 3,980,516 | 9/1976 | Guard | 493/208 |
| 4,534,819 | 8/1985 | Payet et al. | 156/73.3 |
| 4,560,427 | 12/1985 | Flood | 156/515 |
| 4,610,750 | 9/1986 | Mango | 156/73.3 |
| 4,623,420 | 11/1986 | Hinkley | 156/515 |
| 4,693,771 | 9/1987 | Payet et al. | 156/515 |
| 4,711,693 | 12/1987 | Holze, Jr. | 156/515 |
| 4,715,166 | 12/1987 | Kameda | 53/374.4 |

FOREIGN PATENT DOCUMENTS

| | | |
|---|---|---|
| 1 603 221 | 3/1971 | France . |
| 2 106 941 | 5/1972 | France . |
| 639 716 | 7/1950 | United Kingdom . |

*Primary Examiner*—James Engel
*Assistant Examiner*—Linda L. Gray
*Attorney, Agent, or Firm*—Bacon & Thomas

[57] ABSTRACT

A welding and cutting counter head for joining and cutting sheeted materials comprising a welding counter-wheel rotatably supported on a shaft which is supported on a slide for movement towards and away from a location where the materials are joined, a cutting disk adjacent the counter-wheel and mounted for rotation with the counter-wheel, means for mounting the cutting disk for floating radial motion relative to the counter-wheel, and a resilient biasing means for biasing the cutting disk in a direction towards the materials joining location.

9 Claims, 3 Drawing Sheets

WELD/CUT COUNTER-HEAD FOR MACHINE FOR JOINING AND CUTTING SHEETED MATERIALS

FIELD OF THE INVENTION

The present invention relates to the general technical domain of equipment for continuously welding and assembling (joining) products and materials generally in the form of sheets, webs, films, these different terms also including all substrates based on woven or non-woven fibers.

The invention relates more specifically to machines intended for assembling materials including at least partly thermoplastic materials which are joined, as far as the superposed sheets or webs concerned, by any appropriate means generating a partial fusion. In this sense, the machines may comprise, to that end, a head and a counter-head for assembly by heat flux, inherent or added or generated by ultrasounds, as is known.

BACKGROUND OF THE INVENTION

Machines of the above type are used more and more to ensure bond of superposed sheets or webs, in manner similar to what was initially obtained by so-called sewing machines, joining by means of a needle traversing the materials and bearing a yarn joined with that of a shuttle.

Presently known machines, more particularly reserved for bonding webs or sheets including a proportion of thermoplastic materials, make it possible to produce continuous assemblings of the high-speed welding type allowing mass production of articles of low intrinsic value which may even be reserved for single use.

Such is the case in particular for manufacturing articles for protecting objects or persons in relation with the medical or food domain.

Such articles are being increasingly manufactured from sheets or webs of non-woven materials and, by reason of the welding technique, particularly by ultrasounds, and the high speed of intervention of such machines, the need has been felt to cut, simultaneously and without retake, parallel to the assembly line produced, so as to detach the finished article from an adjacent article or from discarded raw material, in one operation.

Although such a need appears understandable, a condition to seal of such articles must be absolutely respected when the finished articles are intended for use in the medical or food domain.

In order to respond to such a need while respecting such a requirement, it has been recommended to fit, parallel to the counter-head of an assembling machine, a disc capable of being brought under relative pressure against the head, so as to execute the desired cut simultaneously to the assembly line.

The propositions which have been formulated consisted in adapting the disc parallel to one of the faces of the counter-wheel of the counter-head, so as to connect them angularly.

The experiments and tests made have shown that such a proposition does not enable the purpose sought after to be attained in practice due to the fact that the peripheral cutting edge of the disc, cooperating with the wheel of the assembling head, undergoes rapid wear, incompatible with the operating speeds of the presently known machines.

The purpose of the invention is to respond to the need to overcome the shortcomings and inefficiency of the known proposition and, to that end, envisages improvements made to the assembly of the cutting disc of a weld/cut counter-head, so that such a disc may present a cutting efficiency which is in relation with the capacities of continuous linear advance and assembling allowed by the machines for assembling or joining by thermo fusion of the fibers constituting the sheet or web materials ("sheet-type materials") to be assembled or the matter of such sheets or webs.

It is a further object of the invention to render assembly of the cutting disc particularly simple so as periodically to allow a partial dismantling of the counter-head so as to allow partial of total replacement thereof and/or of the disc itself, in the event of defectiveness.

SUMMARY OF THE INVENTION

To attain the above objects, the weld/cut counter-head according to the invention is characterized in that the cutting disc is mounted to float radially and is subject to the action of a return member urging it in radial displacement in a reference direction which is that of displacement of the slide bearing the counter-head in the direction of the welding head with which it is adapted to cooperate or towards a material to be assembled.

The invention also relates to an assembly/cut machine comprising a counter-head according to the invention.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
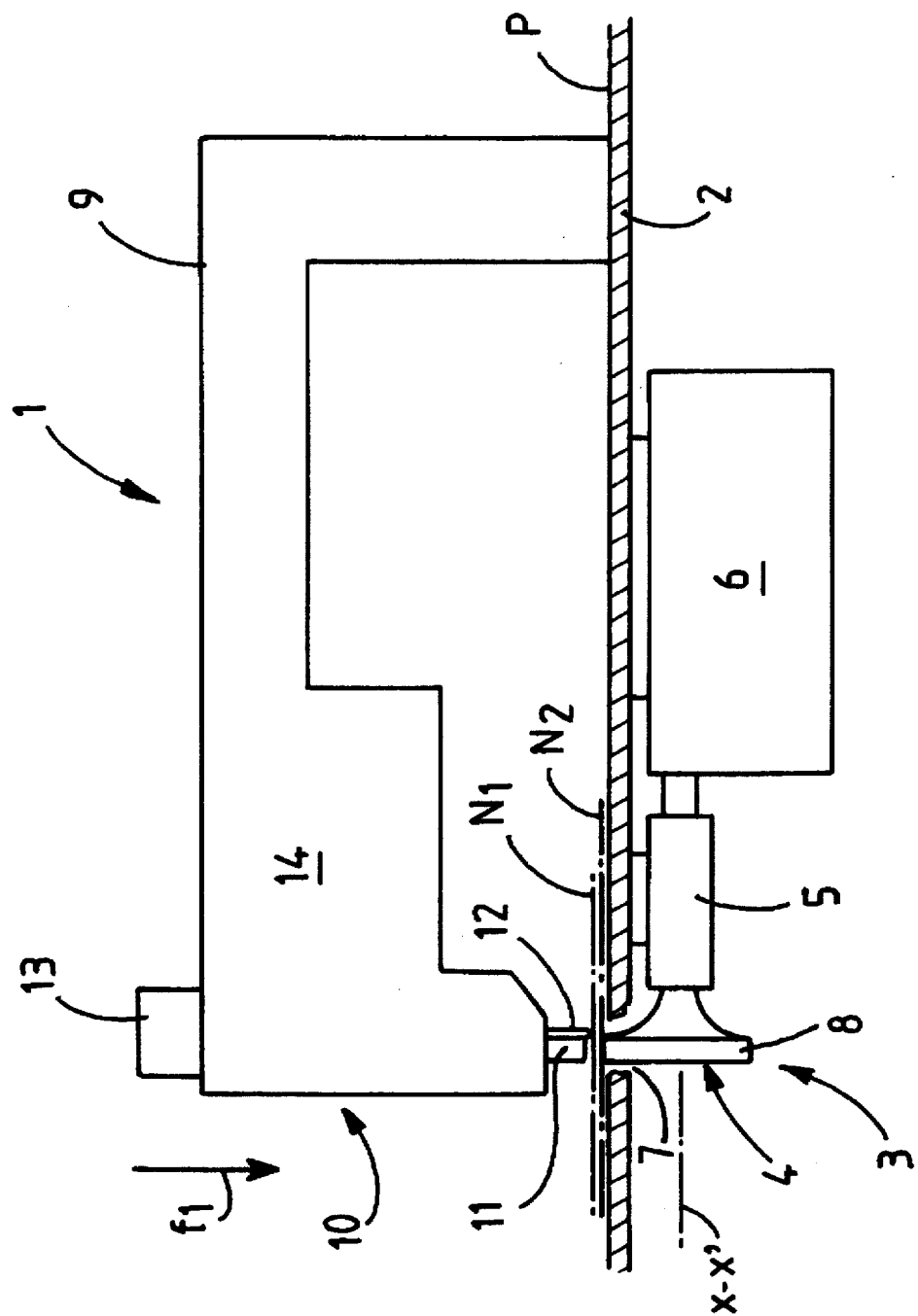
FIG. 1 is a schematic view of a machine for assembling-cutting materials in sheet or web form.

Referring now to the drawings, FIG. 1 shows a machine 1 for assembling (i.e., joining) and cutting materials arranged as superposed sheets or webs, such as webs $N_1$ and $N_2$, all of which may be referred to herein as "sheet-type materials". Such a machine generally comprises a table 2 beneath which is disposed an assembling or welding head 3, comprising a wheel 4 which is shown, by way of illustration and solely indicative, in the form of a sonotrode. A mechanical vibration amplifier 5 is interposed between the sonotrode 4 and an assembly 6 for generating vibrations and driving the sonotrode 4 in rotation on its axis x—x'. The unit constituted by the mechanical amplifier 5 and the assembly 6, is fixed on the lower face of the table 2 so that the sonotrode 4 may traverse a window 7 in the table 2 to be flush, by its peripheral edge 8, with the upper surface of the table 2 constituting a bearing and slide plane P for the superposed webs $N_1$ and $N_2$.

The machine 1 supports, from the upper face of the table 2, a structure 9, of the gantry type, comprising in overhang a weld/cut welding and cutting counter-head 10 disposed opposite the sonotrode 4. The counter-head 10 comprises a counter-wheel 11 associated with a cutting disc 12 and mounted on a slide 13 capable of being displaced, from the position of withdrawal according to FIG. 1, in a reference sense in the direction of arrow $f_1$, by any appropriate means to be brought into cooperation with the peripheral surface 8 of the sonotrode 4 and to pinch thereagainst the webs $N_1$ and $N_2$ which are to be welded.

The member for controlling the displacement of the slide 13 must be considered as being within the scope of the men skilled in the art and for reasons for simplification, has not been shown in FIG. 1. Similarly, the structure 9 incorporates or bears in known manner a driving member 14 which is charged with driving the counter-wheel 11 in rotation in an angular advance which, in known manner, is synchronous and of direction opposite that of the wheel 4.

It must be considered that the means according to the invention as described hereinafter may be applied to all types of machines employing means equivalent to the sonotrode 4, for example constituted by a wheel associated with a generator of heat by addition or by direct supply, so as to provoke in relation with the counter-wheel 11 and by relative pressure therebetween, the at least partial fusion of thermoplastic fibers or of the matter proper constituting the webs $N_1$ and $N_2$.

Figure 2:
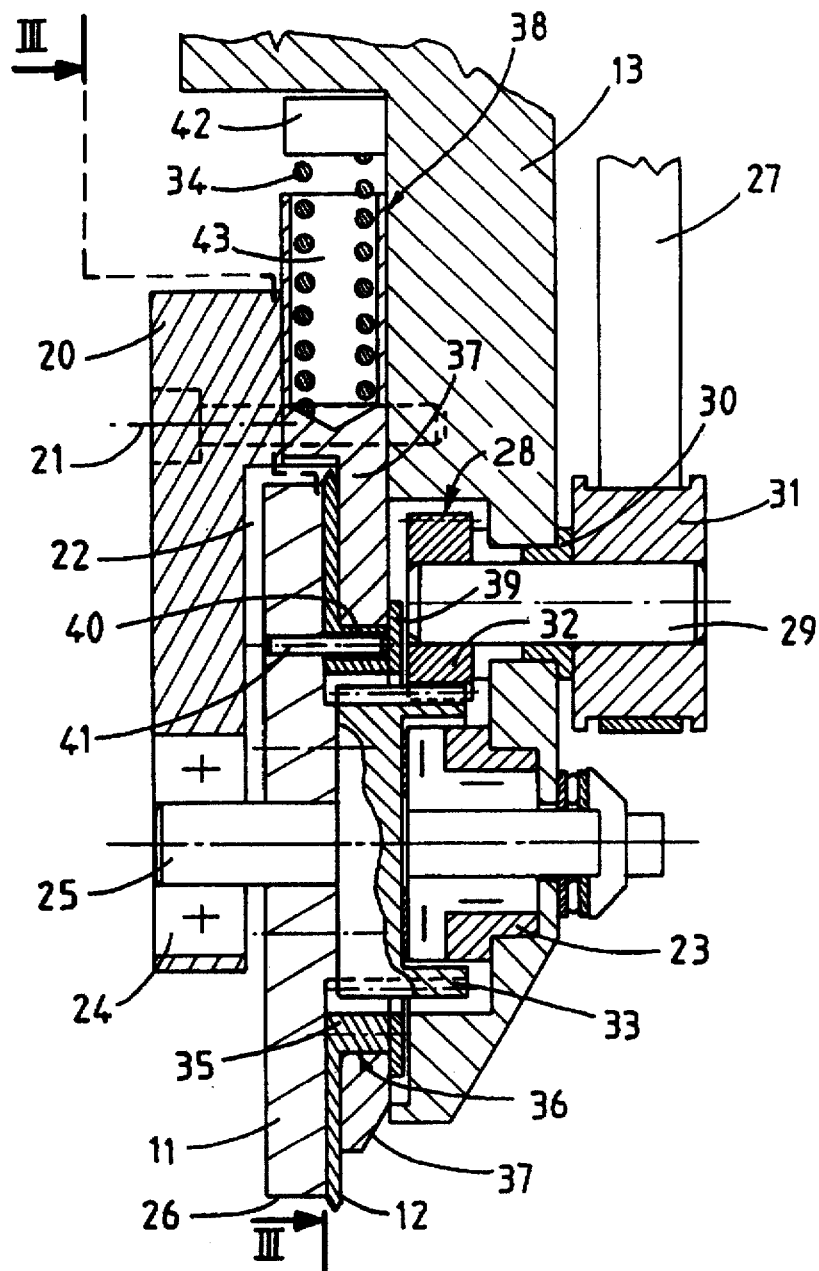
FIG. 2 is a partial section in elevation showing, on a larger scale, the weld/cut counter-head according to the invention.
Figure 3:
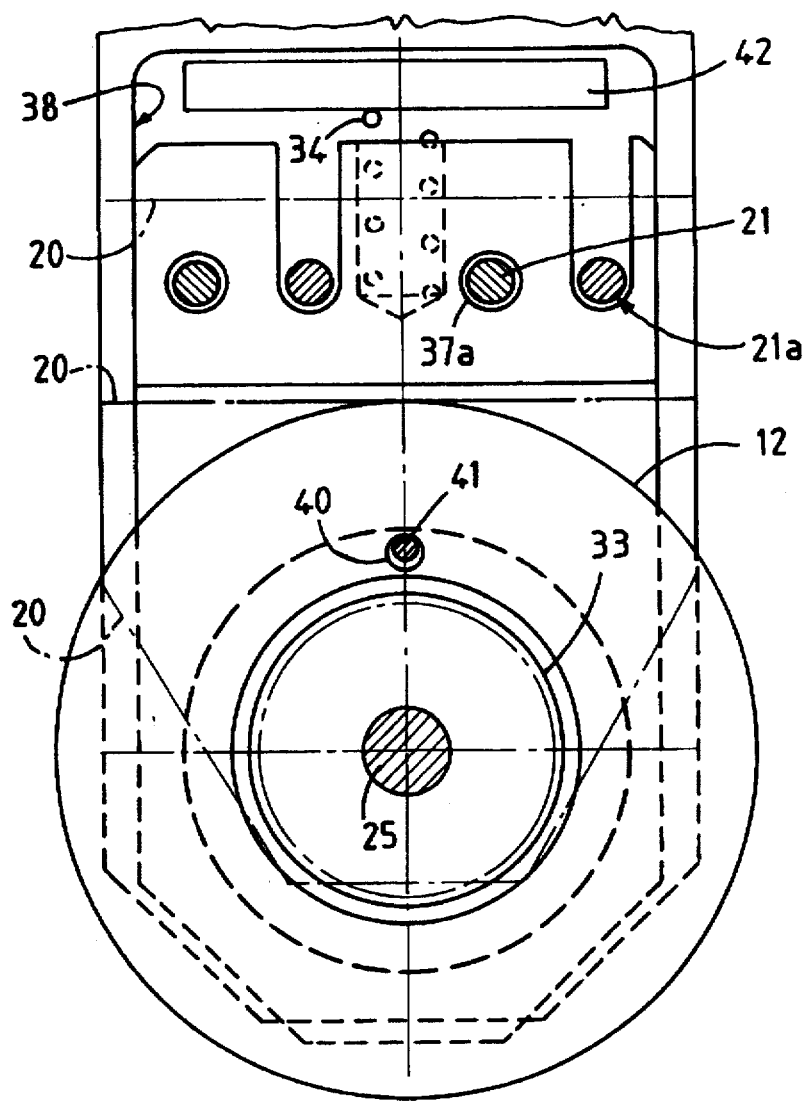
FIG. 3 is a transverse view taken substantially along line III—III of FIG. 2.

According to the invention, the counter-head, more particularly shown in FIGS. 2 and 3, bears by the slide 13 a lateral cheek 20 which is dismountably fixed by members 21 such as screws accessible from the outer face of the cheek 20, as well as via pins 21a. The slide 13 and the cheek 20 together define an open housing 22 and present, coaxially, two bearings 23 and 24 reserved for the support of a shaft 25 free to rotate, axially immobilized and traversing the housing 22. The shaft 25 bears the counter wheel 11 which is angularly connected with the shaft and which is disposed in the housing 22 so that its peripheral edge 26 extends, outside the counter-head 10, opposite the outer periphery 8 of the wheel 4. The shaft 25 is driven in rotation by the motor 14, for example by a drive transmission 27 which is advantageously of the synchronous belt type, but any other arrangement or technical equivalent may be envisaged.

In the example illustrated, the connection between the shaft 25 and the transmission 27 is ensured by reduction gearing 28 comprising a primary shaft 29 mounted in a smooth bearing 30 borne or defined by the slide 13. The primary shaft 29 is surrounded by a driving pulley 31 which cooperates with the transmission 27 and a driving pinion 32 permanently meshing with a bell pinion 33 which is angularly and axially fitted on the shaft 25. A variant embodiment would consist in making the shaft 25 and the bell pinion 33 in one sole unitary piece.

According to an arrangement of the invention, the cutting disc 12 is mounted to float radially in relation with the counter-wheel 11 and is subject to the action of a return member 34 always tending to bias it radially in the reference direction $f_1$.

In a preferred embodiment, the disc 12, whose periphery presents a diameter greater than that of the counter-wheel 11, is mounted by a shoulder 35 in a smooth bearing 36 presented by a slide block 37 mounted to slide in the reference direction $f_1$, in a slideway 38 which is formed by the slide 13 and the cheek 20. The slide block is fitted on pins 21a and presents holes 37a reserved for passage of the screws 21. For reasons which will appear hereinafter, the holes 37a have a diameter greater than that of the screws 21. The bearing 36 is annular and normally coaxial to the shaft 25 and in the embodiment recommended, envelopes the bell pinion 33. The slide block 37 ensures axial immobilization of the cutting disc 12 which is also annular in this embodiment, by a washer 39 which is fixed on the shoulder 35. The disc 12 is thus disposed between the slide block 37 and the counter-wheel coaxial with shaft 25.

The floating assembly is completed by the engagement of the disc 12, by means of axial holes 40, on studs 41 which are borne by the counter-wheel 11. As is shown more particularly in FIG. 3, the holes 40 have a diameter greater than that of the studs 41 which may be constituted by fingers, catches or cylindrical pins of constant section, extending axially.

In the stable or normal state, out of action, as illustrated in FIG. 2, the return member 34 pushes the slide block 37 in the direction of arrow $f_1$ up to a stop position determined by the bearing of at least one of the holes 40 on the corresponding stud, so that the periphery of the cutting disc 12 projects with respect to the periphery 26 of the counter-wheel 11, in the angular sector lying opposite the periphery 8 of the wheel 4.

In active phase, corresponding to the descent of the slide 13 to bring the peripheral edges 26 and 8 in cooperation and to ensure assembly of the webs $N_1$ and $N_2$, the disc 12 abuts on the periphery 8 of wheel 4 and is pushed in floating manner on the studs 41, being applied against the periphery 8 solely by the return force of the member 34.

In this way, the pressure of application is limited in the calibration of the member 34 and ensures application with just the necessary force to produce a cutting effect of the webs $N_1$ and $N_2$ and parallel to the assembly line made between these latter by the pressure of the peripheral edges 26 and 8 and by the supply of heat provoking at least partial fusion of the thermoplastic fibers.

In this way, the application of the floating disc 12 is independent of the pressure exerted by the counter-wheel 11 on the wheel 4 and the calibration of the return member 34 limits this stress of application to just the necessary execution of the cutting function, without mechanically stressing the disc 12 beyond this function. This results in a notably reduced wear factor which gives the cutting disc 12 a duration of function which is largely greater than that obtained by a rigid assembly and which is more in connection with the functional capacities of the counter-wheel 11 and of the wheel 4.

The return member 34 may be constituted by one or more springs, of the helicoidal type, interposed between a bearing 42 of the slide 13 and a housing 43 presented by the slide block 37.

It must be considered that technical equivalents may, of course, be substituted and that, in certain cases, it may also be envisaged to provide the bearing 42 with a stop with adjustable position, so as to offer a possibility of adjusting the return force of the spring or springs 34.

It must also be noted that the assembly recommended makes it possible rapidly to dismantle the cheek 20 via the fixation members 21 and to extract the assembly constituted by this cheek, the slide block 37, the counter-wheel 11 and the disc 12, in one operation in order to facilitate, if necessary, replacement of the disc 12, by acting from the washer 39.

Consequently, and if necessary, a rapid intervention may be made successfully without long-lastingly interrupting operation of the machine.

Figure 4:
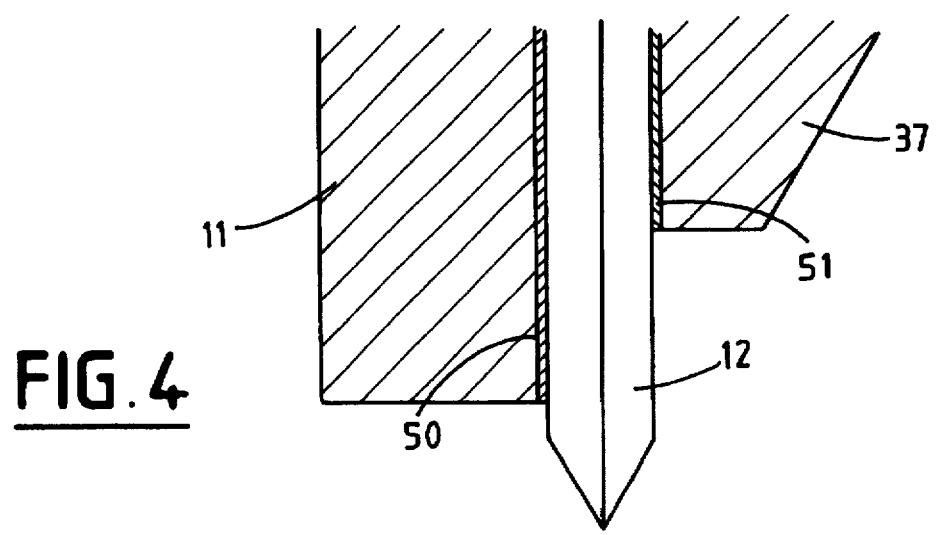
FIG. 4 is a section in elevation on a larger scale illustrating a detail of embodiment of the object of the invention.

FIG. 4 shows another arrangement of the invention wherein it is provided to interpose a film 50 or a layer or coating of material chosen for its anti-friction characteristics and able to perform a function of anti-vibration filter between the disc 12 and at least the counter-wheel 11. FIG. 4 shows that a film 51 is preferably also interposed between the disc 12 and the slide block 37. The cutting disk in FIG. 4 is seen to be contiguous with the films 50,51.

These arrangements are provided by reason in particular of the floating assembly of the disc 12 so as to allow a relative displacement between the counter-wheel 11 and the slide block 37, without risk of seizing and smoothly and precisely, while eliminating the risks of vibrations likely to be produced precisely due to the floating assembly of the disc 12.

The invention is not limited to the examples described and shown, as various modifications may be made thereto without departing from its scope.

What is claimed is:

1. A welding and cutting counter head for, in cooperation with a welding head, joining and cutting sheeted workpiece materials, comprising:

a slide and a lateral cheek together forming an assembly having two shaft-supported bearings;

a shaft supported by said bearings and a welding counter-wheel having at least one lateral face rotatably supported on said shaft, said shaft and said counter-wheel supported on said slide for movement towards and away from a location where the materials are joined by the counter-wheel in cooperation with a welding head;

a driving transmission drivingly connected to the counter-wheel for driving the counter-wheel in rotation;

a cutting disk adjacent the counter-wheel lateral face and mounted for rotation with the counter-wheel;

means for mounting the cutting disk for floating radial motion relative to the counter-wheel;

resilient biasing means for biasing the cutting disk in the direction of advancement of the counter-wheel towards said materials joining location.

2. A welding and cutting counter head according to claim 1, said disk extending parallel to said counter-wheel lateral face.

3. The welding and cutting counter head according to claim 1, including a slide block mounted between said slide and said cheek for reciprocal movement relative to the slide towards and away from said materials joining location; said cutting disk mounted on said slide block.

4. The welding and cutting counter head according to claim 3 wherein said resilient biasing means is arranged to bias said cutting disk via said slide block.

5. The welding and cutting counter head according to claim 3, said slide block including a centering shoulder for rotatably supporting said cutting disk, said cutting disk rotatably mounted on said centering shoulder between said lateral face and said slide block; means on the slide block for preventing axial movement of the cutting disk relative to the centering shoulder; said cutting disk and centering shoulder being annular in form and arranged concentrically with the counter-wheel supporting shaft.

6. The welding and cutting counter head according to claim 5, including axial studs carried by said counter-wheel, said studs extending toward said cutting disk; said disk including apertures for receiving said studs; said apertures being larger than the studs to enable said radial motion of the cutting disk relative to the counter-wheel.

7. The welding and cutting counter head as claimed in claim 2, including an anti-vibration film between the cutting disk and the lateral face of the counter-wheel, said cutting disk disposed contiguous with said film.

8. The welding and cutting counter head according to claim 3, including an anti-vibration film between the slide block and the cutting disk, said cutting disk mounted contiguous with said film.

9. The welding and cutting counter head according to claim 3, including an anti-vibration film between the cutting disk and the lateral face of the counter-wheel and a second anti-vibration film between the slide block and the cutting disk, said cutting disk mounted contiguous with both said films.

* * * * *